US012082619B2

(12) United States Patent
Liu

(10) Patent No.: US 12,082,619 B2
(45) Date of Patent: *Sep. 10, 2024

(54) ELECTRONIC VAPING DEVICES

(71) Applicant: Altria Client Services LLC, Richmond, VA (US)

(72) Inventor: Loi Ying Liu, Hong Kong (CN)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,388

(22) Filed: May 12, 2023

(65) Prior Publication Data

US 2023/0329349 A1 Oct. 19, 2023

Related U.S. Application Data

(60) Continuation of application No. 17/385,173, filed on Jul. 26, 2021, now Pat. No. 11,684,088, which is a (Continued)

(30) Foreign Application Priority Data

Oct. 5, 2012 (HK) .................................. 121098150

(51) Int. Cl.
*A24F 40/50* (2020.01)
*A24F 40/40* (2020.01)
(Continued)

(52) U.S. Cl.
CPC .............. *A24F 40/50* (2020.01); *A24F 40/40* (2020.01); *A24F 40/57* (2020.01); *H05B 1/0244* (2013.01); *A24F 40/10* (2020.01)

(58) Field of Classification Search
CPC ........ A24F 47/008; A24F 40/57; A24F 40/40; A24F 40/50; A24F 40/10; H05B 1/0244
See application file for complete search history.

(56) References Cited

U.S. PATENT DOCUMENTS 6,040,560 A 3/2000 Fleischhauer et al.
2003/0033055 A1 2/2003 McRae et al.
(Continued)

FOREIGN PATENT DOCUMENTS

CN 1040914 A 4/1990
CN 1045691 A 10/1990
(Continued)

OTHER PUBLICATIONS

European Office Action issued Apr. 7, 2017 in European Application No. 13 844 300.7.
(Continued)

*Primary Examiner* — Shogo Sasaki
(74) *Attorney, Agent, or Firm* — Harness, Dickey & Pierce P.L.C

(57) ABSTRACT

An electronic smoke apparatus comprising an inhale sensor, a smoke source containing vapor-able smoke flavored substances, an electric heater for heating up the smoke flavored substances, and a power management controller to control power supply to operate the heater; wherein the power management controller is to adaptively supply operating power to the heater according to characteristics of a smoking inhaling event detected at said inhale sensor.

20 Claims, 7 Drawing Sheets

Related U.S. Application Data division of application No. 16/740,952, filed on Jan. 13, 2020, now Pat. No. 11,103,011, which is a division of application No. 16/364,656, filed on Mar. 26, 2019, now Pat. No. 10,568,363, which is a division of application No. 16/148,276, filed on Oct. 1, 2018, now Pat. No. 10,244,796, which is a division of application No. 16/044,870, filed on Jul. 25, 2018, now Pat. No. 10,123,570, which is a division of application No. 14/433,556, filed as application No. PCT/IB2013/059166 on Oct. 7, 2013, now Pat. No. 10,111,465.

(51) Int. Cl.

| | |
|---|---|
| ***A24F 40/57*** | (2020.01) |
| ***H05B 1/02*** | (2006.01) |
| *A24F 40/10* | (2020.01) |

(56) References Cited

U.S. PATENT DOCUMENTS

| | | | | | |
|---|---|---|---|---|---|
| 2008/0092912 | A1* | 4/2008 | Robinson | A24F 47/008 131/200 |
| 2009/0095311 | A1* | 4/2009 | Han | A24F 47/008 131/194 |
| 2009/0133691 | A1* | 5/2009 | Yamada | A61M 11/041 128/200.16 |
| 2009/0272379 | A1* | 11/2009 | Thorens | A24F 47/008 128/202.21 |
| 2010/0200006 | A1 | 8/2010 | Robinson et al. | |
| 2011/0126848 | A1* | 6/2011 | Zuber | A24F 47/008 131/329 |
| 2011/0209717 | A1 | 9/2011 | Han | |
| 2011/0303231 | A1 | 12/2011 | Li et al. | |
| 2012/0227752 | A1 | 9/2012 | Alelov | |
| 2013/0263869 | A1 | 10/2013 | Zhu | |
| 2013/0340750 | A1* | 12/2013 | Thorens | A24F 47/008 128/202.21 |

FOREIGN PATENT DOCUMENTS

| | | | |
|---|---|---|---|
| CN | 101518361 | | 9/2009 |
| CN | 101557728 | A | 10/2009 |
| CN | 201482667 | | 5/2010 |
| CN | 102088875 | A | 6/2011 |
| CN | 102106611 | A | 6/2011 |
| CN | 102227175 | A | 10/2011 |
| CN | 103404969 | | 11/2013 |
| CN | 103415222 | | 11/2013 |
| DE | 102007011120 | A1 | 9/2008 |
| EP | 0358114 | A2 | 3/1990 |
| EP | 0376632 | B1 | 2/1994 |
| EP | 2378905 | A1 | 10/2011 |
| EP | 2454956 | A1 | 5/2012 |
| EP | 2460423 | A1 | 6/2012 |
| KR | 101184758 | B1 | 9/2012 |
| WO | WO-2010/145805 | A1 | 12/2010 |
| WO | WO-2011/033396 | A2 | 3/2011 |
| WO | WO-2012/109371 | A2 | 8/2012 |

OTHER PUBLICATIONS

Chinese Office Action issued Nov. 16, 2017 in Chinese Application No. 201380052134.1.
Examination Report issued Mar. 16, 2018 in European Patent Application No. 13 844 300.7.
Non-Final Office Action issued Jan. 12, 2018 in U.S. Appl. No. 14/433,556.
Notice of Allowance issued May 2, 2018 in U.S. Appl. No. 14/433,556.
International Search Report issued Feb. 27, 2014 in PCT/IB2013/059166.
Chinese Office Action issued Mar. 20, 2017 in Chinese Application No. 201380052134.1.
Search Report issued Jun. 1, 2016 in Chinese Application No. 2013800521341.
Written Opinion issued Feb. 27, 2014 in PCT/IB2013/059166.
Chinese Office Action issued Jun. 14, 2016 in Chinese Application No. 201380052134.1.
Search Report issued Dec. 18, 2014 in Chinese Application No. 201310301523.5.
Office Action issued Dec. 26, 2014 in Chinese Application No. 201310301523.5.
Office Action issued Dec. 16, 2015 in Chinese Application No. 201310301523.5.
Extended European Search Report issued Nov. 11, 2015 in European Application No. 13844300.7.
International Preliminary Report on Patentability issued Apr. 7, 2015 in International Application No. PCT/IB2013/059166.
Notification on Grant of Patent Right for Invention issued May 17, 2018 in Chinese Patent Application No. 201380052134.1.
Notice of Allowance issued Aug. 29, 2018 in U.S. Appl. No. 14/433,556.
Notice of Allowance issued Sep. 14, 2018 in U.S. Appl. No. 16/044,870.
Notice of Allowance issued Nov. 28, 2018 in U.S. Appl. No. 16/148,276.
Notice of Allowance issued Oct. 18, 2019 in U.S. Appl. No. 16/364,656.
Communication pursuant to Article 94(3) issued Dec. 12, 2019 in European Application No. 13 844 300.7.
First Office Action issued Aug. 13, 2020 in Chinese Application No. 201810832874.1.
Examination Report issued Mar. 18, 2021 in Indian Application No. 813/KOLNP/2015.
Extended European Search Report issued May 11, 2021 in European Application No. 21151712.3.
Office Action issued on Jun. 3, 2021 in Chinese Application No. 201810832874.1.
Non-Final Office Action issued Mar. 19, 2021 in U.S. Appl. No. 16/740,952.
Notice of Allowance issued May 5, 2021 in U.S. Appl. No. 16/740,952.
Chinese Office Action and English translation thereof dated Nov. 2, 2021.
European Notice of Opposition mailed Dec. 1, 2021.
Examination Report dated Jul. 5, 2023 issued in European Patent Application No. 21151712.3.
European Summons to attend oral proceedings pursuant to Rule 115(1) EPC for European Application No. 13844300.7 mailed Dec. 8, 2023.
European Written Decision Rejection the Opposition for European Application No. 13844300.7 mailed Jul. 1, 2024.

* cited by examiner

ELECTRONIC VAPING DEVICES

CROSS-REFERENCE TO RELATED APPLICATIONS

This application is a Continuation Application of U.S. application Ser. No. 17/385,173, filed Jul. 26, 2021, now U.S. Pat. No. 11,684,088, which is a Divisional Application of U.S. application Ser. No. 16/740,952, filed Jan. 13, 2020, now U.S. Pat. No. 11,103,011, which is a Divisional Application of U.S. application Ser. No. 16/364,656, filed Mar. 26, 2019, now U.S. Pat. No. 10,568,363, which is a Divisional Application of U.S. application Ser. No. 16/148,276, filed Oct. 1, 2018, now U.S. Pat. No. 10,244,796, which is a Divisional Application of U.S. application Ser. No. 16/044,870, filed Jul. 25, 2018, now U.S. Pat. No. 10,123,570, which is a Divisional Application of U.S. application Ser. No. 14/433,556, filed Apr. 3, 2015, now U.S. Pat. No. 10,111,465, which is the U.S. National Stage of International Application No. PCT/IB2013/059166, filed Oct. 7, 2013, and which claims priority to Hong Kong Application No. 12109815.0, filed on Oct. 5, 2012, the entire contents of each of which are incorporated herein by reference.

FIELD

The present disclosure relates to electronic smoke apparatus, and more particularly, to electronic smoke apparatus comprising an adaptive power supply management device. The present disclosure also relates to power management devices for use with electronic smoke apparatus.

BACKGROUND

Electronic smoke apparatus provide a useful alternative to conventional tobacco burning cigarettes or herb burning smoking devices. Electronic smoke apparatus typically comprise a smoke source for generating a smoke flavored aerosol mist or vapor that resembles cigarette smoke and an electric heater. When electric power is delivered to the heater, the heater will operate to heat up the smoke source and produce smoke flavored aerosol mist or vapor for inhaling by a user to simulate cigarette smoking. A smoke source typically comprises a propylene glycol- or glycerin- or polyethylene glycol-based liquid solution. The liquid solution is commonly known as e-juice or e-liquid. An electronic cigarette is a known example of electronic smoke apparatus and electronic cigarettes are also known as e-cigarette or e-cig. Electronic cigar and pipe is another example of electronic smoke apparatus.

While improvements in electronic smoke apparatus designs and construction have made the use of electronic smoke apparatus more closely resembles that of conventional smoking apparatus, it is noted that the responsiveness of smoke vapor generation to inhaling of a user is somewhat undesirable and requires improvements.

DESCRIPTION OF FIGURES

The present disclosure will be described by way of example with reference to the accompanying drawings, in which.

DESCRIPTION OF DISCLOSURE

There is disclosed an electronic smoke apparatus comprising an inhale sensor, a smoke source containing vaporable smoke flavored substances, an electric heater for heating up the smoke flavored substances, and a power management controller to control power supply to operate the heater; wherein the power management controller is to adaptively supply operating power to the heater according to characteristics of a smoking inhaling event detected at said inhale sensor.

There is also disclosed a power management device for an electronic smoke apparatus, wherein the device comprises a controller to adaptively supply operating power to a heater to operate the electronic smoke apparatus according to received signals which represent characteristics of a smoking inhaling event.

Example implementations of the present disclosure are described below.

Figure 1:
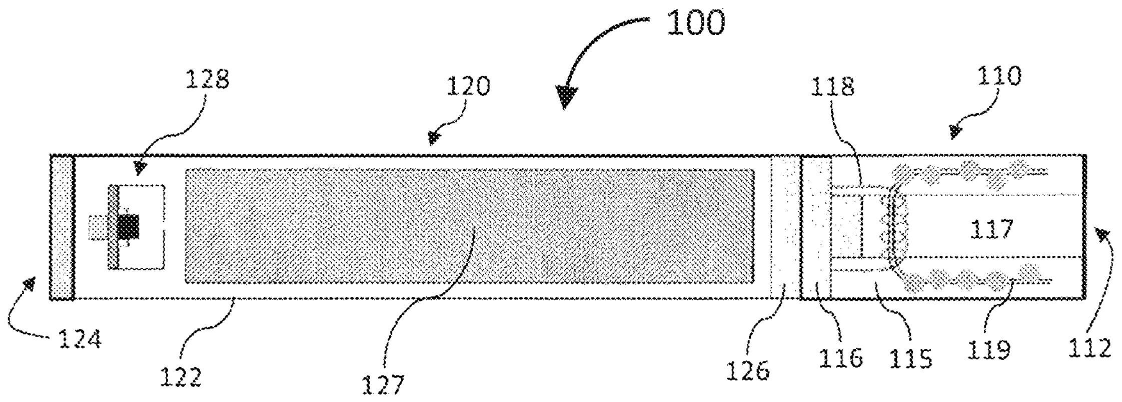
FIG. 1 is a schematic diagram of an example electronic cigarette according to the present disclosure.

An electronic cigarette 100 depicted in FIG. 1 comprises an elongate member that resembles the shape, dimensions and appearance of a tobacco filled and paper wrapped filtered cigarette. The elongate member is rigid, substantially cylindrical and comprises a mouth piece 110 and a main body 120 which are on opposite longitudinal ends. The mouth piece in this example is a "cartomizer" as depicted in FIG. 1A that is detachable from the main boy 120 to facilitate replacement of the cartomizer when the smoke flavored substances contained in the cartomizer has exhausted or when a new flavored is desired. A cartomizer is a terminology in the field of electronic smoke apparatus which means a cartridge type device containing a smoke flavored liquid with a built-in atomizer to bring about vaporization of the smoke flavored liquid.

The mouth piece 110 in this example is adapted to resemble the filter portion of a filtered cigarette and includes a tubular housing that defines an inhale end 112 and an attachment end 114. The inhale end 112 is at a free longitudinal end of the electronic cigarette and is adapted for making oral contact with a user during use to facilitate simulated cigarette smoking. The attachment end 114 is on a longitudinal end opposite the inhale end 112 and comprises a threaded connector part 116 in releasable engagement with a counterpart or complementary threaded connector part 126 on the main body 120. The threaded connector part 116 is an example of a releasable fastening part that facilitates convenient detachment of the cartomizer from the main body 120 when replacement is needed.

A pair of insulated electrical contacts is carried on the threaded connector part 116 to provide electrical interconnection between a battery inside the main body and a heating element inside the cartomizer. The electrical contacts for making electrical interconnection with the battery are exposed on a lateral surface of the threaded connector part 116 which oppositely faces the main body 120 to facilitate electrical interconnection therewith by making electrical contact with counterpart contacts on the main body 120 when the mouth piece 110 and the main body 120 are in tightened mechanical engagement. The threaded connector part 116 is metallic and the portions of the electrical contacts which pass through the threaded connector are electrically insulated.

The portion of the tubular housing of the mouth piece 110 that extends between the inhale end 112 and the threaded connector part 116 includes an outer peripheral wall and an inner peripheral wall. The outer peripheral wall, the inner peripheral wall, the inhale end and the attachments ends collectively define a reservoir 115 that is filled with a vaporizable smoke flavored liquid. A smoke flavored liquid is typically a solution of propylene glycol (PG), vegetable glycerin (VG), and/or polyethylene glycol 400 (PEG 400) mixed with concentrated flavors. The smoke flavored liquid may optionally contain a concentration of nicotine. An air passage way 117 extending between the inhale end and the attachment end is defined by the inner peripheral wall. This air passage way 117 also defines an inhale aperture of the mouth piece 110. An assembly comprising a heater element 118 and cotton wicks 119 extends laterally across the air passageway 117 at a location between the threaded connector part 116 and the inhale end 112. The cotton wicks 119 extend laterally between diametrically opposite sides of the inner peripheral wall and are for wicking smoke flavored liquid from the reservoir into the air passage way 117. The heater element 118 is wound on the cotton wicks 119 and is adapted to cause vaporization of the smoke flavored liquid carried on the cotton wicks 119 upon heating operation of the heating element 118.

The main body 120 comprises an elongate and tubular member 122 having a first longitudinal end 124 and a second longitudinal end in contact with the mouth piece 110. The tubular member 122 is substantially cylindrical with lateral dimensions substantially identical to that of the mouth piece to provide geometrical continuity between the main body 110 and the mouth piece 120. The first longitudinal end 124 of the tubular member 122 is distal from the mouth piece and forms a free end of the electronic cigarette 100. A threaded connector part 126 that is complementary to the threaded connector part 116 of the mouth piece 110 is formed on the second longitudinal end of the tubular member. An elongate and cylindrical battery 127 is inserted inside the tubular member to provide electrical power to operate the electronic cigarette 110 while leaving a longitudinally extending air passage way for air to pass from the first longitudinal end 124 to the second longitudinal end. The battery 127 is wired connected (connection not shown) to a pair of insulated electrical contacts on a lateral surface of the threaded connector part 126 that oppositely faces the mouth piece 120 to facilitate electrical interconnection with corresponding contact terminals on the counterpart threaded connector part 116 on the mouth piece 120. The threaded connector part 126 is metallic and the portions of the electrical contacts which pass through the threaded connector are insulated. To facilitate smooth movement of air across the battery, the cross-sectional dimension of the battery is smaller than the internal clearance of the elongate member and longitudinally extending air guides are formed on the inside of the elongate body to support the battery and to guide air to move more smoothly through the space between the outside of the battery and the interior of the tubular member 122. A stop member is mounted at the first longitudinal end to maintain the battery 127 and other components inside the tubular member 122. The stop member has an aperture to permit air passage into and out of the tubular member and to permit viewing of the LED from outside the electronic cigarette.

An electronic module 128 comprising an LED (light emitting diode), an inhale sensor, a microprocessor (or micro-controller) and peripheral circuitry on a printed circuit board (PCB) is mounted inside the tubular member 122 at a location between the battery 122 and the first longitudinal end 124. The tubular member 122 may be made of metal or hard plastics to provide a sufficient strength to house the battery and the electronic module 128. The electronic module 128 is wire connected to the battery (wiring not shown). The LED faces outwards of the electronic cigarette and is to glow in red during operating responsive to inhaling by a user at the mouth piece to simulate the color of naked flames generated in the course of conventional smoking. The microprocessor is to operate the heater by controlling power supply to the heater element upon detection of inhaling by the inhale sensor. The inhale sensor and the microcontroller collectively define a power management arrangement to control power supply to the heater to operate the electronic cigarette.

The inhale sensor comprises an airflow sensor to detect a smoking inhaling event at the inhale end. A smoking inhaling event in the present context means an act of inhaling by a user (or smoker) to simulate smoking by mouth holding the mouth piece of an electronic cigarette and sucking air out of the electronic cigarette. Although the inhale sensor is disposed at the first longitudinal end 124 of the electronic cigarette and is distal from the inhale end 112, the mouth piece 110 and the main body 120 collectively define an air-tight air passageway so that inhaling by a user at the inhale end will generate a stream of incoming air detectable by the airflow sensor.

The inhale sensor comprises an airflow sensor which is arranged to detect air movement at the first longitudinal end due to a smoking inhaling event taking place at the inhale end. To facilitate detection of a smoking inhaling event, the airflow sensor has associated electrical properties that are variable according to characteristics of a smoking inhaling event. Example of such characteristics include, for example, onset of a smoking event, strength of inhaling power and change in strength of inhaling power. Capacitance and resistance values are the typical associated electrical properties that can be used. The microprocessor is connected to the airflow sensor to measure the associated electrical properties of the airflow sensor that are variable according to the properties of an incoming airflow stream. The measured electrical properties are then utilized to determine characteristics of a smoking inhaling event, such as onset or beginning or a smoking inhaling event, inhaling power, and variation in inhaling power.

In this example, the airflow sensor comprises a plate-like detection member that will move, deflect or deform upon encountering an incoming airflow stream exceeding a predetermined threshold. The movement, deflection or deformation of the detection member of the airflow sensor will result in a change in the associated electrical properties and such properties or their change are used by the microprocessor to determine characteristics of a smoking inhaling event.

An example airflow sensor and its example use in electronic cigarettes are described in WO 2011/033396 A2 by the same inventor and the publication is incorporated herein by reference. Other airflow sensors and detectors suitable for use in electronic cigarette from time to time can also be used with electronic cigarettes where appropriate and without loss of generality.

Figure 1B:
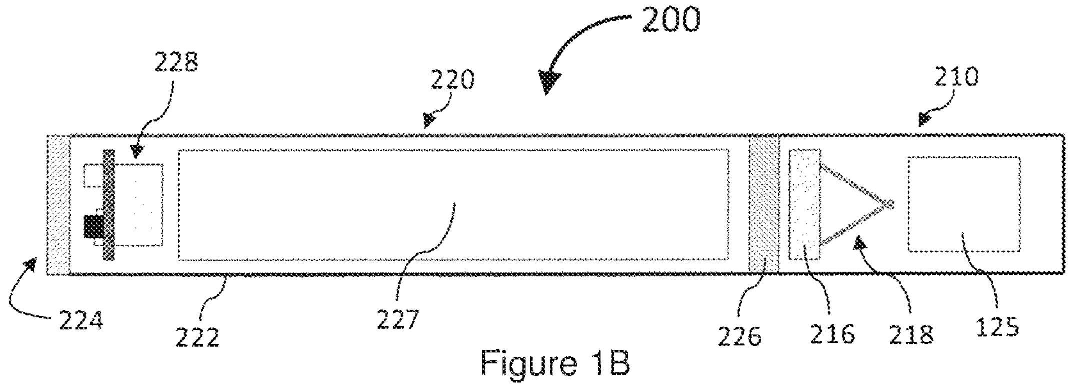
FIG. 1B is a schematic diagram of another example electronic cigarette according to the present disclosure.
Figure 1A:
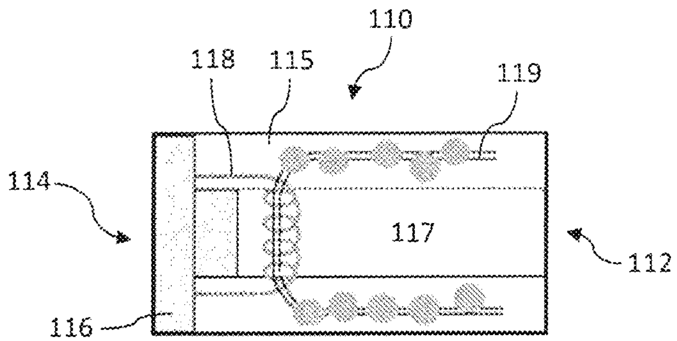
FIG. 1A is a perspective view of the mouth piece of the electronic cigarette of FIG. 1.

FIG. 1B depicts another example of an electronic cigarette 200 according to the present disclosure. The electronic cigarette 200 comprises a main body 210 and a mouth piece 220. The main body 200 is identical to that of electronic cigarette 100 and all parts thereof are incorporated by reference with each corresponding numeral increased by 100. The mouth piece 210 is similar to that of electronic cigarette 100 except that a heater/atomizer 218 and a smoke flavor liquid containing cartridge 125 are placed inside the rigid tubular housing to perform the functions of the cartomizer. The description on the mouth piece 110 above is incorporated herein by reference where appropriate with each corresponding numeral increased by 100.

Figure 1C:
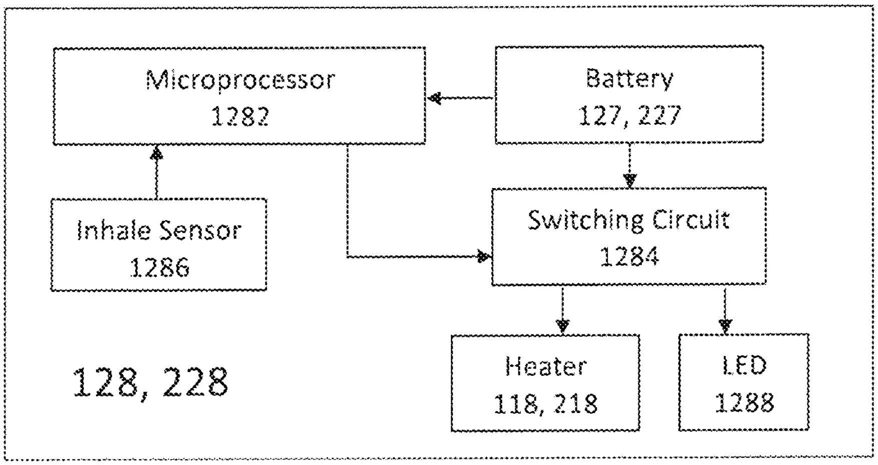
FIG. 1C is a schematic diagram of an example power management arrangement for the electronic cigarettes of FIGS. 1 and 1B.

As depicted in FIG. 1C, the electronic module 128 comprises a power management arrangement. The power management arrangement comprises a microprocessor 1282 which is powered by the battery 127, 227. The heater 118, 218 is connected to the battery by a switching circuit 1284 which regulates voltage and power supply to the heater 118, 128. The microprocessor 1282 is connected to an inhale sensor 1286 to detect smoking inhaling characteristics and the detected smoking inhaling characteristics will be used by the microprocessor 1282 to operate the switching circuit 1284 to regulate power supply to the heater and an LED 1288. Example operation of the microprocessor to regulate the operating power supply will be described below.

In use, a user inhaling at the inhale end 112, 212 of the electronic cigarette to perform a smoking will create a low pressure region inside the mouth piece 110, 210. This low pressure region will cause outside air to come into the main body 122, 222 through the first longitudinal end 124, 224, since the main body and the mouth piece collectively form an air tight pipe. The outside air that arrives at the first longitudinal end will cause instantaneous relative movement or distortion of the detection member of the airflow sensor. This instantaneous relative movement or distortion, or variation in movement or distortion, of the air sensor plates will be transformed into data representing airflow direction and/or inhale power when interpreted by the microprocessor. When the detected airflow direction corresponds to smoking inhaling and the detected inhale power reaches a predetermined threshold, the microprocessor will activate the battery to operate the heater of the smoke source to cause vaporization of the smoke flavored liquid inside the smoke source and smoke flavored vapor will pass from the mouth piece and to the user. The smoke source can be a cartomizer or a cartridge-and-atomizer type assembly without loss of generality. Smoking inhaling in the present context means inhaling at the inhaling end of the mouth piece in a smoking-like manner.

As the smoke flavored liquid inside the smoke source requires time to heat up before vaporization will take place, there is a noticeable time delay between an act of inhaling by a user and the arrival of smoke flavored vapor to a user. The delay time generally depends on the thermal capacity and the instantaneous temperature of the smoke source. The heating up delay time is referred to as heat up latency herein. Sometimes the delay time can be as long as a few seconds, which is equal to the time of a typical smoking inhaling cycle. Such a delay can make electronic smoking a strange and unrealistic experience. As it is noted that the output voltage of some batteries, notably Lithium batteries which are commonly used to power electronic cigarettes, will fall with time of use, it is expected that the heat up latency will aggravate or increase with the time of use or age of an electronic cigarette. In the present context, the time of a smoking inhaling cycle is the time between beginning and end of an inhale action.

Figure 2:
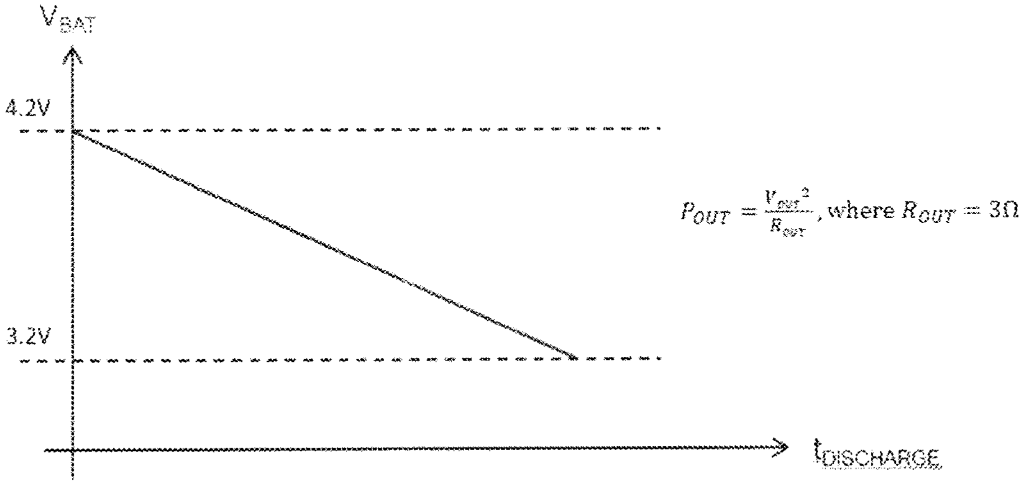
FIG. 2 is a schematic diagram depicting example deterioration of output voltage over time of a Lithium battery used in an electronic cigarette.
Figure 3:
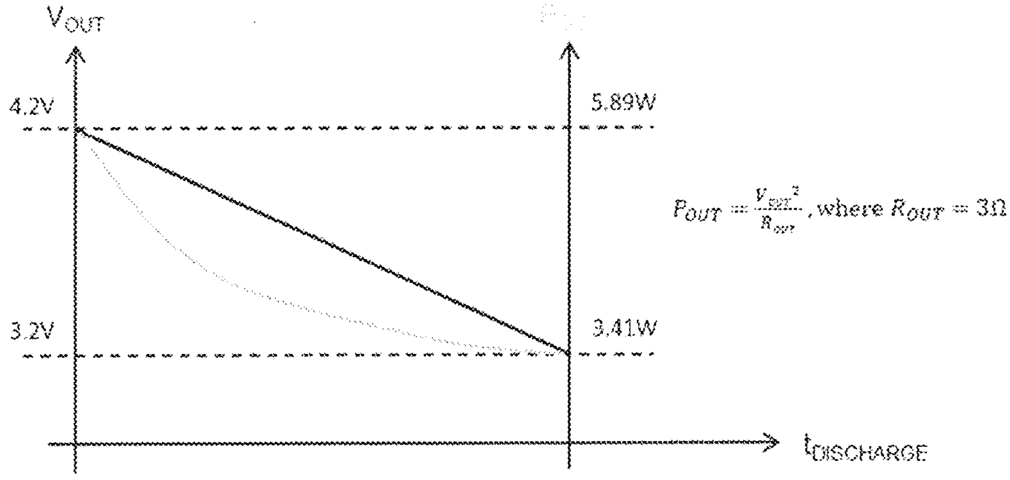
FIG. 3 is a schematic diagram depicting drop in battery output power associated with the drop in the output voltage of FIG. 2.

As depicted in FIG. 2, the terminal voltage $V_{out}$ of an example Lithium battery having a rated voltage of 4.2 V will gradually drop to say 3.2V after repeated use. In an example where the heater has an internal resistance of 3Ω and direct resistive heating is used such that the terminal voltage is applied directly across the resistive heater terminals, the output power of the battery will drop rapidly as shown in the lower curve of FIG. 3. The battery power output as represented by the lower curve is according to the relationship $P_{out}=V_{out}^2/R_{out}$, where $R_{out}=3\Omega$. In addition to increase in heat up latency time, the loss in battery terminal voltage $V_{out}$ also results in a reduction in power output and this in turns brings about a noticeable reduction in the smoke vapor generation rate during normal smoking operation.

Figure 4:
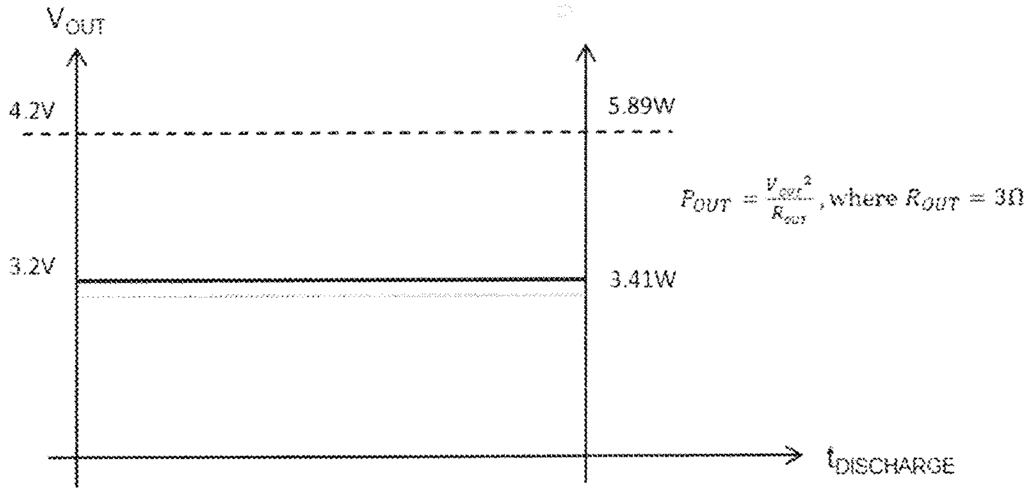
FIG. 4 is a schematic time diagram illustrating example output voltage and power characteristics at two discrete output voltage (and power) levels.
Figure 5:
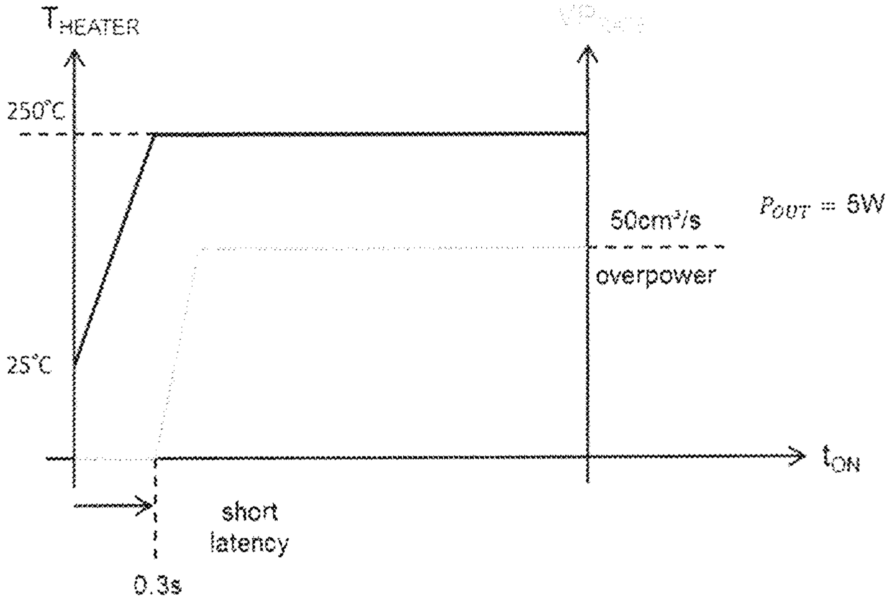
FIG. 5 is a schematic time diagram illustrating rise in temperature of the smoke source (upper graph), rise in smoke flavored vapor volume rate (lower graph) and their time or latency correlation at a first supply power level.

The power supply management of the electronic cigarette of FIGS. 1 and 1A is set to supply a constant or substantially constant voltage to the electric heater in order to alleviate the aggravation of heat up latency time delay and performance degradation due to an extended period of use. For example, a constant or substantially constant voltage as depicted in FIG. 4 can be supplied by the battery through use of pulse width modulation (PWM) techniques. PWM can be facilitated by a high frequency switching circuit driven by the microprocessor as a controller of the power management arrangement of the electronic cigarette. By maintaining a constant or substantially constant voltage supply, a short heat up latency can be maintained for the useful life of the battery. As depicted in the lower graph of FIG. 5, a short heat up latency time of, say, 0.3 second, can be maintained. This heat up latency time is the time to bring the smoke source from room temperature (say, 25° C.) to the boiling point (say, 250° C.) of the smoke flavored liquid, as depicted in the upper graph of FIG. 5. After the smoke flavored liquid of the smoke source has reached its boiling point, smoke flavored vapor will be generated at a constant volume rate due to the constant power supply. In this example, smoke flavored vapor is generated at a rate of 50 $cm^3/s$ with a voltage supply of 4.2V to the heater.

While a constant voltage supply to the resistive heater helps alleviate aggravation of heat up latency time delay and performance degradation due to repeated use of the battery, the supply of a constant volume rate of smoke flavored vapor during an entire smoking inhaling cycle may not be entirely desirable. For example, continuing generation of the same volume rate of smoke flavored vapor after a peak suction force by a user has already occurred may be excessive, if not wasteful.

Figure 6:
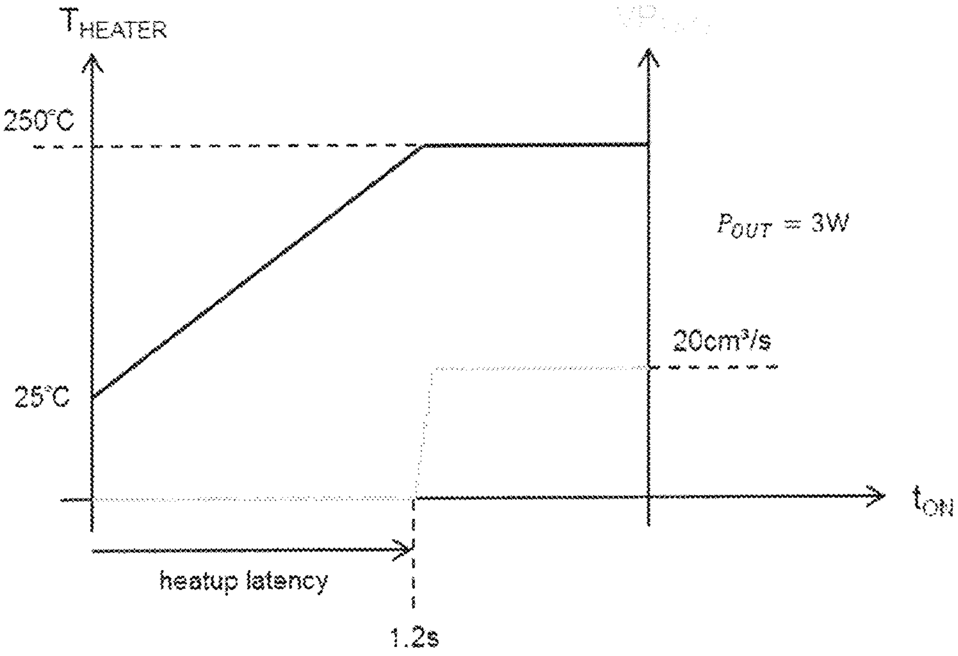
FIG. 6 is a schematic time diagram illustrating rise in temperature of the smoke source (upper graph), rise in smoke flavored vapor volume rate (lower graph) and their time or latency correlation at a second supply power level.

On the other hand, if a lesser volume rate of smoke flavored vapor is to be generated at steady state operation, the lesser volume rate would mean a lower running level operating power supply to the heater and this would result in a longer heat up latency. As depicted in FIG. 6, a lesser volume generation rate of smoke flavored vapor, for example, at 20 $cm^3/s$, at running state operation will mean a constant power supply $P_{out}$ of 3 W to the same heater and this translates into a longer latency time of say 1.2 s, compared to the 0.3 second heat up latency at 5 W power supply.

In order to mitigate the dilemma between choosing a long heat up latency and an excessive volume rate at steady state operation, the electronic cigarettes of FIGS. 1 and 2 employ an adaptive power supply control scheme. An example implementation of such an adaptive power supply control scheme is illustrated with reference to FIGS. 7A, 7B and 7C.

Figure 7A:
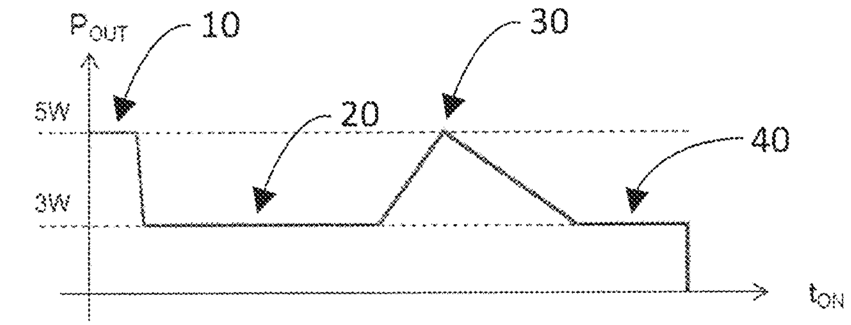
FIGS. 7A, 7B and 7C are respectively time diagrams depicting: example variation of battery power output to the heater during a smoking inhaling event according to an adaptive power control scheme of the present disclosure, associated variation in smoke liquid temperature with time, and associated variation in smoke vapor generation volume rate.

Referring to FIG. 7A, a power boost is supplied to the heater at the onset of a smoking inhaling event. The power boost is to last for an initial period 10 during which the smoke source is heated from room temperature to a vaporization state. After the smoke source has entered into the vaporization state, a reduced power level is supplied to the heater. This reduced power level is set to maintain the electronic cigarette in a running or operational state in which the smoke source is maintained at the vaporization state. During the period 20 of this running state, a steady state volume rate of smoke flavored vapor is generated and this steady state volume rate is significantly lower than the rate that would have been generated by the supply power at the power boost level if the smoke source were at the vaporization state. When heavier inhaling is detected at the inhale sensor, the power supply level to the heater will be increased during this heavier inhaling state 30 and the volume rate of smoke flavored vapor generation will increase. A state of heavier inhaling herein means a state at which the inhaling power has a strength that is above the inhaling strength required to keep the electronic cigarette in the running or operational state. When the inhaling strength begins to fall during the heavier inhaling state 30, the power supply to the heater will follow and begin to fall. As a result, the volume rate of smoke flavored vapor generation will also decrease and the decrease will stop when the steady state volume rate is reached. The fall in power supply $P_{out}$ to the heater will stop when the power supply to the heater equals to the power to maintain the running or operational state. In this example, $P_{out}$ is W at power boost and 3 W at the running or operational state.

This adaptive power supply scheme provides a more realistic smoking experience to a user as the volume rate of smoke flavored vapor generation substantially follows the change in inhaling strength.

Figure 7B:
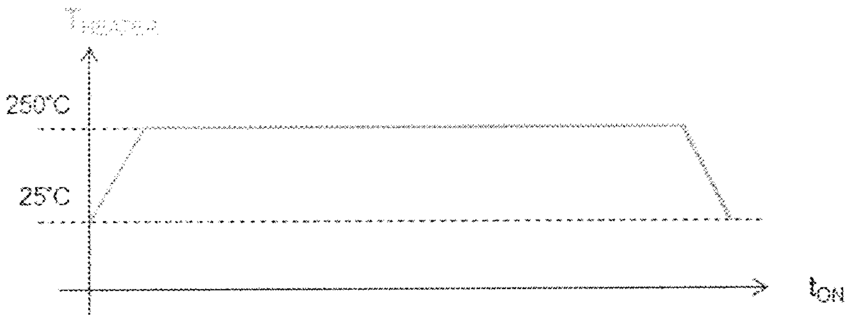

Referring to FIG. 7B, the smoke source is heated up from room temperature (25° C.) to its boiling or vaporization point (250° C.) during the initial period 10 and is maintained at the boiling or vaporization point during the period when the electronic cigarette is in operation.

Figure 7C:
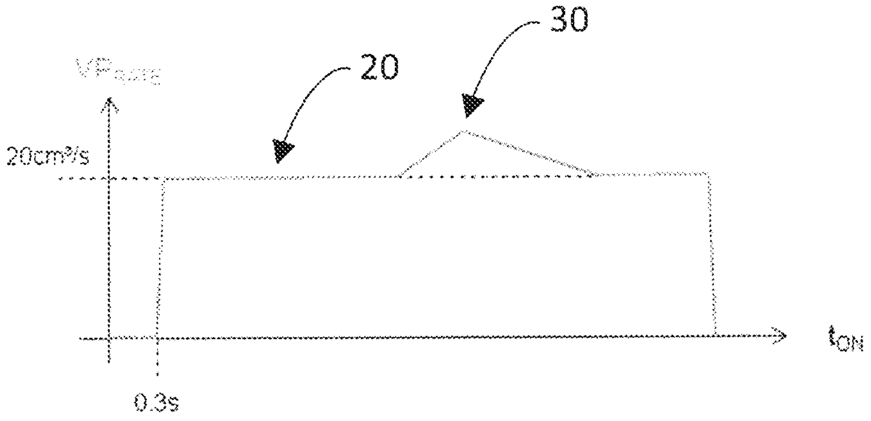

Referring to FIG. 7C, a noticeable volume rate of smoke flavored vapor begins to be generated after the lapse of the initial period 10. The volume rate of generation of smoke flavored vapor is maintained at the steady state volume rate during the period 20. The volume rate of generation of smoke flavored vapor is increased upon detection of heavier inhaling during the heavier inhaling state 30. In this example, the duration of the initial period 10 is 0.3 s which is a short heat up latency time not noticeable by many users of electronic smoke apparatus or smokers.

In this example, the battery power supply to the heater is regulated by the microprocessor of the power management arrangement comprised in the electronic module 128. The running period 20 may be regarded as a standby period during which no active inhale power is detected at the inhale sensor after activation of the electronic cigarette.

The example electronic cigarette of FIGS. 1 and 2 includes a capacitive airflow sensor and example relationship between the instantaneous air pressure detected at the airflow sensor due to inhaling at the mouth piece and the associated change in capacitance value is shown in Table 1 below:

TABLE 1

| Sensor Pressure (Pa) | % Change in Capacitance | C value |
|---|---|---|
| Atmospheric (A) | 0.0% | C0 |
| A + 100 | 0.8% | C1 |
| A + 200 | 1.6% | C2 |
| A + 400 | 3.2% | C3 |
| A + 600 | 4.8% | C4 |
| A + 800 | 6.4% | C5 |

In this example, the above electrical properties of the capacitive airflow sensor are used by the microprocessor of the power management arrangement of FIG. 1C to determine smoking inhaling characteristics as follows. In this example airflow sensor, a detected inhale pressure of A+200 Pa is set to be an activation threshold pressure and this corresponds to a detected capacitance value of C2. The maximum detectable inhale pressure is at C5, i.e., A+800 Pa, at the inhale sensor and this corresponds to a change in capacitance value of +6.4% compared to the capacitance value of the inhale sensor at atmospheric pressure. The power supply $P_{out}$ to the heater is arranged such that a boost power corresponding to the maximum available power output (5 W) will be supplied to the heater upon activation. The instantaneous power supply to the heater will vary between a maximum power supply level (say, 5 W) and a minimum power supply level (say, 3 W). In this example, the power supply will gradually increase from the minimum power of 3 W at C2 to the maximum power of 5 W at C5, and the maximum power supply level is the same as the boost power which is to be supplied on detection of the maximum detectable inhale pressure of A+800 Pa. Conversely, the power supply will gradually decrease from the maximum power of 5 W at C5 to the minimum power of 3 W at C2. Example operation of the example electronic cigarette will be described below.

When there is no inhaling suction at the mouth piece, the pressure at the airflow sensor will be the atmospheric pressure A. Assuming that A+200 Pa is set to be an activation threshold pressure which corresponds to the detection of smoking inhaling at the mouth piece, the microprocessor will set the electronic cigarette into operation by supplying boost power to the heater upon detecting a capacitance value corresponding to the activation threshold capacitance C2, as depicted in operation region 10 of FIG. 7A. After the boost power application period has expired, the smoke source will have reached its vaporization or boiling temperature and the instantaneous heating power will depend on the instantaneous inhaling pressure. In this example, the instantaneous inhaling pressure is at A+200 Pa, and the running state power supply of 3 W will be supplied, as depicted in operation region 20 of FIG. 7A.

When the inhale power as represented by the pressure at the inhale senor is subsequently increased to A+400 Pa, A+600 Pa, & A+800 Pa, as depicted in operation region 30 of FIG. 7A, the microprocessor will increase the supply power to the heater according to the measured capacitive values C3, C4 and C5 respectively. This increase is represented by the rising edge on the triangular portion of region 30. When the inhale power drops from the maximum detectable inhale pressure of A+800 Pa, the microprocessor will decrease the supply power according to the instantaneously detected capacitance value. This decrease is represented by the falling edge on the triangular portion of region 30.

When the inhale power drops to the activation threshold pressure of A+200 Pa, the microprocessor will reduce the supply power to a steady state level to maintain the electronic cigarette in a running or operational state at which the smoke source is maintained at the vaporization state, as depicted at region 40 of FIG. 7A.

When the inhale power further drops to below the activation threshold pressure of A+200 Pa, for example, to A+100 Pa, the microprocessor will stop power supply and turn off the heater to complete a smoke inhale cycle. In this example, a pressure of lower than A+200 Pa is considered as a non-smoking induced pressure event to mitigate inadvertent activation.

In an example, the power supply to the heater may be maintained at the minimum power supply level or running state power supply level even after the inhale pressure has dropped below the activation pressure to maintain the smoke source at the vaporization state. In such an example, when the detected pressure is below the activation threshold pressure for an extended period of time, say 1 second, the microprocessor will turn off the power supply and end a smoking inhaling event until the next activation threshold pressure is detected at the inhale sensor. When the microprocessor detects the next activation threshold pressure, it will reactivate the heater in the manner described above.

Figure 8:
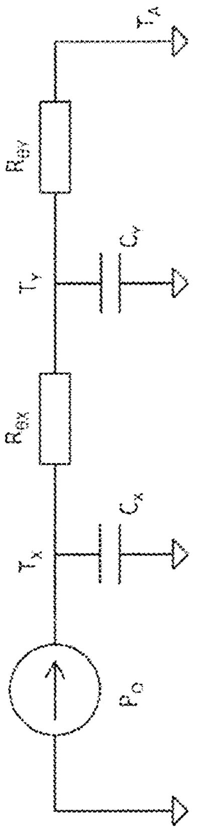
FIG. 8 is an example equivalent circuit model of a cartomizer for use in the electronic cigarette of FIG. 1.

To help determine or estimate the instantaneous temperature of the smoke liquid inside the cartomizer so that the processor can adjust power supply to the heater with reference to the instantaneous temperature of the smoke liquid, an equivalent circuit model of the cartomizer as depicted in FIG. 8 is used as a convenient example. The equivalent circuit comprises a first resistor ($R_{\theta x}$) and a second resistor ($R_{\theta y}$) connected in series. The upstream end of the first resistor which is not connected to the second resistor is connected to the power supply terminal while the downstream end of the second resistor which is not connected to the first resistor is connected to the cartomizer casing. The equivalent circuit also includes a first capacitor ($C_y$) connecting from the junction between the first and the second resistors to the cartomizer casing, and a second capacitor ($C_x$) connecting from the upstream end of the first resistor to the cartomizer casing.

In the equivalent circuit of FIG. 8, the symbols have the following meaning:

| | | | |
|---|---|---|---|
| $T_A$ | Ambient temperature | $R_{\theta x}$ | Thermal resistance between the inner and outer parts of the cartomizer |
| $T_{BP}$ | Boiling point of the smoke liquid | $R_{\theta y}$ | Thermal resistance between the outer part of the cartomizer and ambient |
| $T_X$ | Temperature of the inner part of the cartomizer | $C_x$ | Thermal capacitance of the inner part of the cartomizer |
| $T_Y$ | Temperature of the outer part of the cartomizer | $C_y$ | Thermal capacitance of the outer part of the cartomizer |

Figure 9:
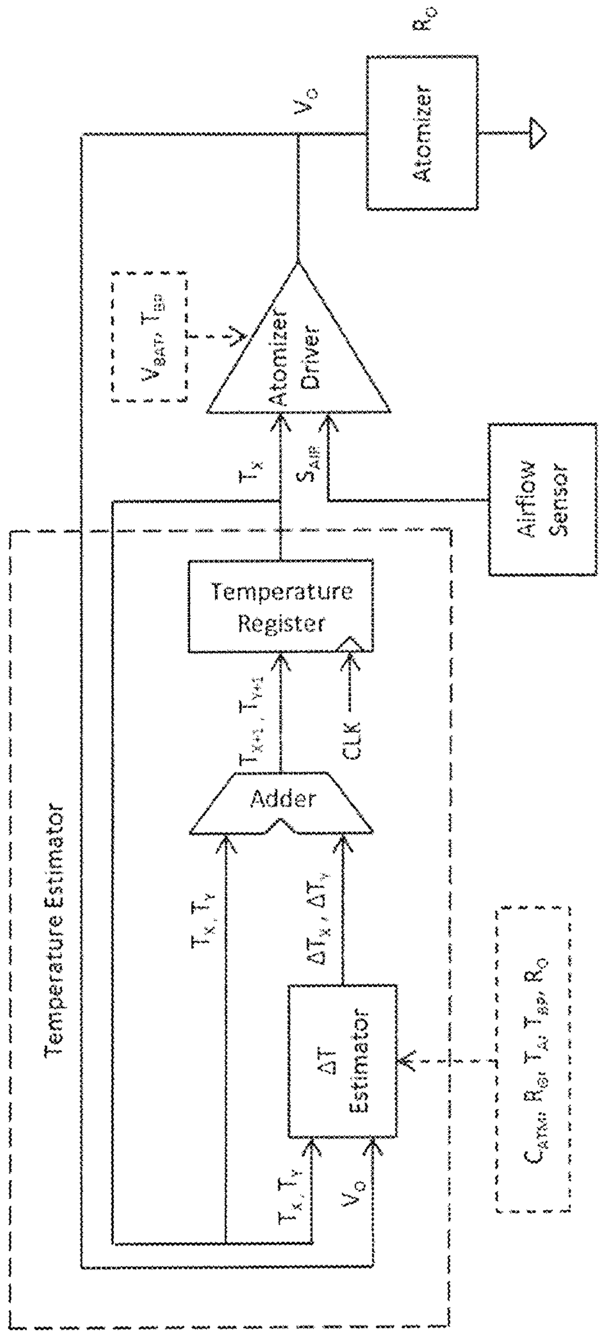
FIG. 9 is a schematic functional block diagram of an example adaptive power supply control scheme according to the present disclosure.

As depicted in FIG. 9, the power supply to the cartomizer can be controlled with reference to the instantaneous temperature of the liquid inside the cartomizer with reference to temperature change of the smoke liquid, and the temperature change can be estimated using the following relationship:

$$P_O = \frac{V_O^2}{R_O}$$

$$T_{X+1} = T_X + \frac{P_O - \frac{T_X - T_Y}{R_{\theta X}}}{C_X}\Delta t$$

$$T_{Y+1} = T_Y + \frac{T_A - T_Y}{R_{\theta Y} C_Y}\Delta t$$

Where $P_o$ is the instantaneous power output to the heater, $V_o$ is the voltage output, $R_o$ is the total resistance of the heater, and Δt is the heating time. $T_A$ is set to 25° C. as a convenient example.

Figure 10A:
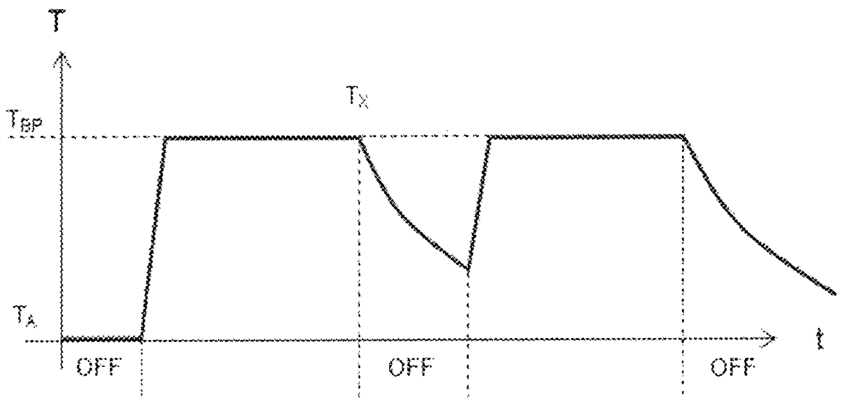
FIGS. 10A, 10B and 10C are respectively time diagrams depicting: example variation in inhale power detected at the airflow sensor during an example smoking inhaling cycle, associated adaptive power output to the heater, and associated output waveforms at the temperature estimator of FIG. 9.

As depicted in FIG. 10A, when the microprocessor has detected a threshold inhale pressure at the airflow sensor, the microprocessor will activate the heater by supplying a boost or ramping power from the battery to the heater. This activation with a power boost or ramp cycle will rapidly bring the smoke liquid to its boiling temperature. When this boiling temperature is reached, the temperature of the smoke liquid will not rise further and the microprocessor will reduce the power supply to a running power level to maintain a running level of smoke vapor volume generation. When the user stops inhaling, the change of pressure at the airflow sensor will be detected by the microprocessor and the microprocessor on detecting a drop of pressure corresponding to a stop of smoking will stop power supply to the heater. When this happens, the smoke liquid temperature will drop, as shown in the third time segment of FIG. 10A. When the user starts inhaling again, as shown in the fourth timing segment of FIG. 10A, the microprocessor will again supply a boosting power to the heater, thereby bringing the smoke liquid to its boiling point with a shorter latency time since the boiling liquid at that time is still well above the ambient temperature.

Therefore, the present disclosure has disclosed an adaptive power supply scheme in which the smoke vapor volume generation rate is set to be substantially dependent on or determined by the inhale power at the inhale end of the apparatus. In an example, the controller or microprocessor is set to operate the heater such that the power supply to the heater for heating the smoke source is dependent on the instantaneous inhale power applied to the inhale end of the apparatus.

Figure 10B:
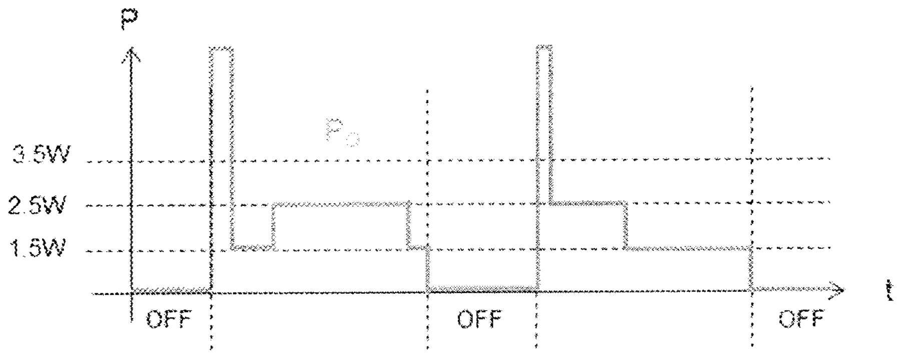

In an example, the microprocessor is set to supply the heater with a plurality of discrete power supply levels in response to changes in inhale power, as depicted schematically in FIG. 10B. In this, the same inhale capacitive sensor is used but a plurality of inhale power levels is set as per table 2 below.

TABLE 2

| Sensor Pressure (A + Pa) | % Change in Capacitance | Atomizer Output | Output Power (W) |
|---|---|---|---|
| 100 | 0.8% | OFF | 0 |
| 200 | 1.6% | ON_ S1 | 1.5 |
| 400 | 3.2% | ON_ S2 | 2.5 |
| 600 | 4.8% | ON_ S3 | 3.5 |
| 800 | 6.4% | ON_ S4 | 4.5 |

Figure 10C:
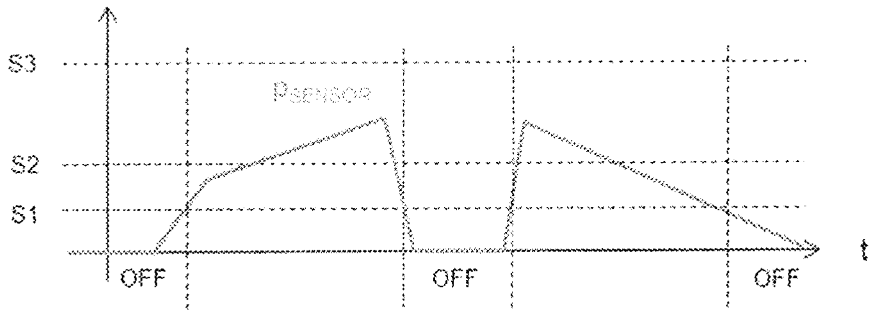

As schematically shown in FIG. 10C and Table 2, four inhale power levels (S1, S2, S3, S4) are set. The inhale power levels correspond to the pressure levels as set out in Table 2 and the associated percentage change in capacitive values of the inhale sensor. As schematically depicted in FIG. 10B a power boost is supplied to the heater at the onset or activation of operation of the electronic smoke apparatus. The power supply will be reduced from the power boost level to a first running power level of 1.5 W after the smoke source begins to generate smoke vapor and when the inhale power is at a level between S1 and S2. When the inhale power is increased to a level between S2 and S3, the power output is set to operate at a second running power level of 2.5 W. When the inhale power is further increased to a level between S3 and S4 (not shown), the power output is set to operate at a third running power level of 3.5 W. The power output to the heater will fall to zero when no inhale power is detected, as represented by the OFF segments on the second diagram. When a user resumes inhaling, a power boost is generated again, as represented by the second power spike on FIG. 10B. The duration (or width) of this power boost spike is substantially shorter than the first power boost spike, since at the time when the heater begins to resume heating, the smoke liquid is well above the ambient temperature $T_A$.

While the above examples have been used to help illustrate the present disclosure, it should be appreciated that the examples are only illustrative and non-limiting. For example, while a cartomizer has been used as a convenient example, atomizers or cartridge with heating elements and filled with smoke liquid can be used without loss of generality. Furthermore, the adaptive power supply examples described above can be used separately or in combination according to user preferences. Moreover, the example schemes use a plurality of 4 inhale power level and 4 discrete power supply levels for illustration, it should be appreciated that the levels used are merely for illustration and are not limiting. While the mouth piece is detachable form the electronic cigarette body in this example for convenient illustration, the mouth piece can be non-releasable from the cigarette body without loss of generality. While an equivalent model is used for temperature estimation, thermal sensors can be used for detecting temperature of the smoke liquid as a useful alternative.

Furthermore, it should be readily understood by persons skilled in the art that the example pressure values, capacitance values, changes in capacitance values, power supply values, timing values, etc., are provided to assist understanding.

The invention claimed is:

1. An electronic aerosol-generating device, comprising:
a heater to generate an aerosol;
a switching circuit configured to control supply of operating power to the heater to generate the aerosol; and
a controller configured to control the switching circuit to
supply the operating power at a first power level in response to detecting a first level of airflow through the electronic aerosol-generating device, the first level of airflow being at or above a first threshold level,
reduce the operating power from the first power level to a second power level after expiration of a first time period following detection of the first level of airflow,
reduce the operating power from the second power level to zero in response to detecting a second level of airflow through the electronic aerosol-generating device,
increase the operating power from zero to the first power level in response to detecting a third level of airflow through the electronic aerosol-generating device, the third level of airflow being at or above the first threshold level, and
reduce the operating power from the first power level to the second power level after expiration of a second time period following detection of the third level of airflow, the second time period being shorter than the first time period.

2. The electronic aerosol-generating device of claim 1, wherein the second level of airflow is below the first threshold level.

3. The electronic aerosol-generating device according to claim 1, wherein the first power level is a maximum operating power applied to the heater during an associated puff event.

4. The electronic aerosol-generating device according to claim 1, wherein the first time period is less than or equal to 1 second.

5. The electronic aerosol-generating device of claim 1, further comprising:
a sensor configured to output signals indicative of a level of airflow through the electronic aerosol-generating device; and wherein
the controller is configured to detect the level of airflow through the electronic aerosol-generating device based on the signals output from the sensor.

6. The electronic aerosol-generating device according to claim 5, wherein
the sensor includes a capacitive airflow sensor having a capacitance value that varies in response to the level of airflow through the electronic aerosol-generating device.

7. The electronic aerosol-generating device according to claim 1, wherein the heater is configured to heat an aerosol-generating substance to generate the aerosol.

8. The electronic aerosol-generating device according to claim 7, wherein the aerosol-generating substance is a liquid.

9. The electronic aerosol-generating device according to claim 8, further comprising:
a reservoir configured to hold the liquid; and wherein
the heater is configured to heat liquid drawn from the reservoir.

10. The electronic aerosol-generating device according to claim 1, further comprising:

a power supply configured to provide the operating power to the heater via the switching circuit.

11. A power management device for an electronic aerosol-generating device, the power management device comprising:

a switching circuit configured to control supply of operating power to a heater to generate an aerosol; and a controller configured to control the switching circuit to supply the operating power at a first power level in response to detecting a first level of airflow through the electronic aerosol-generating device, the first level of airflow being at or above a first threshold level, reduce the operating power from the first power level to a second power level after expiration of a first time period following detection of the first level of airflow, reduce the operating power from the second power level to zero in response to detecting a second level of airflow through the electronic aerosol-generating device, increase the operating power from zero to the first power level in response to detecting a third level of airflow through the electronic aerosol-generating device, the third level of airflow being at or above the first threshold level, and reduce the operating power from the first power level to the second power level after expiration of a second time period following detection of the third level of airflow, the second time period being shorter than the first time period.

12. The power management device of claim 11, wherein the second level of airflow is below the first threshold level.

13. The power management device according to claim 11, wherein the first power level is a maximum operating power applied to the heater during an associated puff event.

14. The power management device according to claim 11, wherein the first time period is less than or equal to 1 second.

15. The power management device of claim 11, further comprising:

a sensor configured to output signals indicative of a level of airflow through the electronic aerosol-generating device; and wherein the controller is configured to detect the level of airflow through the electronic aerosol-generating device based on the signals output from the sensor.

16. The power management device according to claim 15, wherein the sensor includes a capacitive airflow sensor having a capacitance value that varies in response to the level of airflow through the electronic aerosol-generating device.

17. The power management device according to claim 11, wherein the switching circuit is configured to control the supply of operating power to the heater to heat an aerosol-generating substance to generate the aerosol.

18. The power management device according to claim 17, wherein the aerosol-generating substance is a liquid.

19. A method of operating an electronic aerosol-generating device to generate an aerosol, the method comprising:

supplying operating power to a heater at a first power level in response to detecting a first level of airflow through the electronic aerosol-generating device, the first level of airflow being at or above a first threshold level;

reducing the operating power from the first power level to a second power level after expiration of a first time period following detection of the first level of airflow;

reducing the operating power from the second power level to zero in response to detecting a second level of airflow through the electronic aerosol-generating device;

increasing the operating power from zero to the first power level in response to detecting a third level of airflow through the electronic aerosol-generating device, the third level of airflow being at or above the first threshold level; and reducing the operating power from the first power level to the second power level after expiration of a second time period following detection of the third level of airflow, the second time period being shorter than the first time period.

20. The method according to claim 19, wherein the first power level is a maximum operating power applied to the heater during an associated puff event.

* * * * *